Feb. 18, 1941.  G. G. McNAMARA, JR  2,232,550
STEERING APPARATUS
Filed Dec. 23, 1939
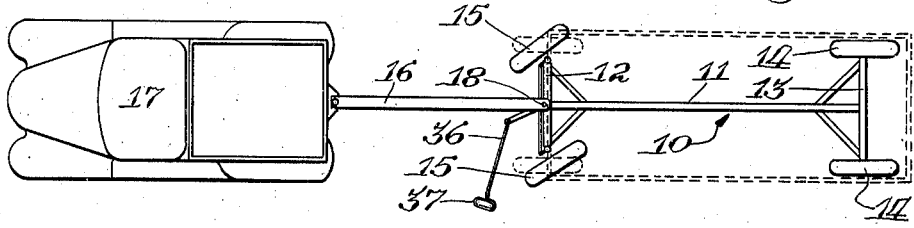
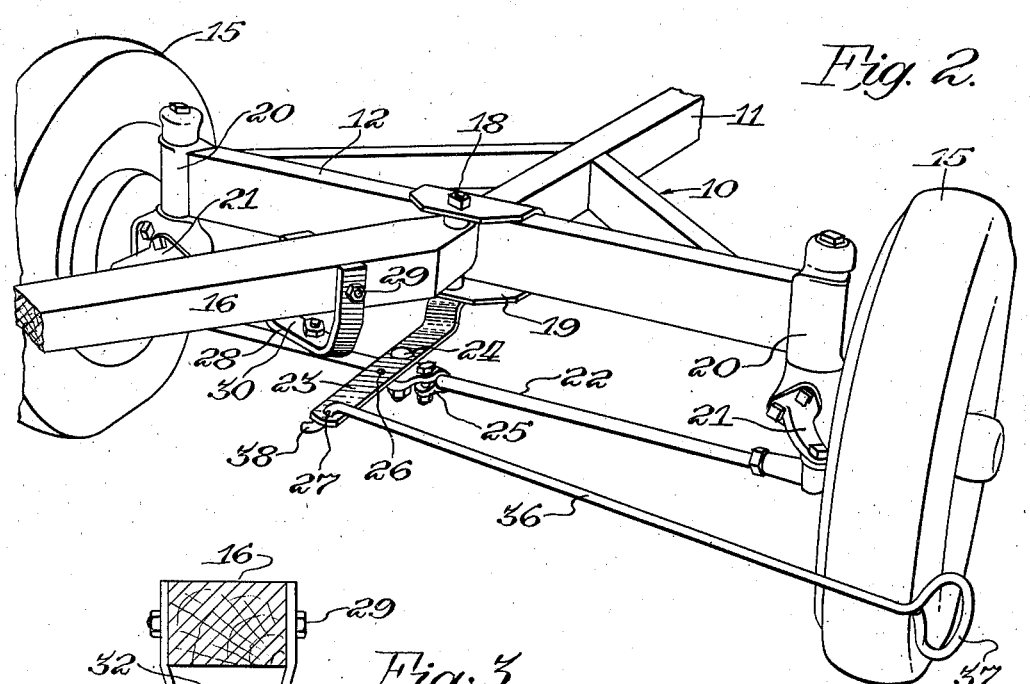
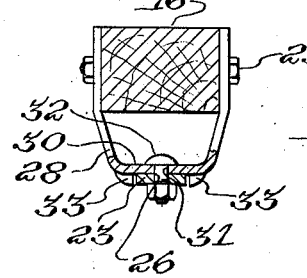
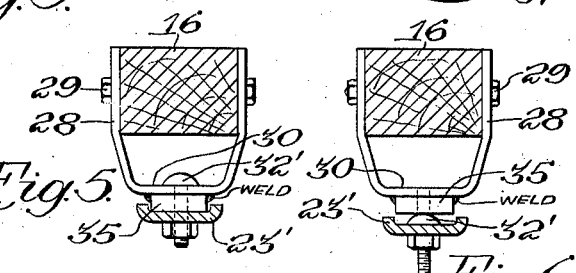
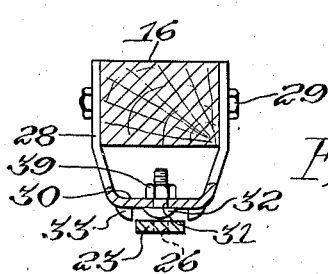
Inventor
Gordon G. McNamara, Jr.
By Paul O. Pippel, Atty.

Patented Feb. 18, 1941

2,232,550

UNITED STATES PATENT OFFICE 2,232,550

STEERING APPARATUS

Gordon G. McNamara, Jr., Chicago, Ill., assignor to International Harvester Company, a corporation of New Jersey Application December 23, 1939, Serial No. 310,695

4 Claims. (Cl. 280—33.55)

This invention relates to vehicle steering apparatus and more particularly to an auxiliary steering arrangement for a vehicle of the trailer type.

The invention pertains especially to trailers of the four wheel type having steerable front wheels provided with auto-type steering mechanism operable by the draft element connected between the trailer and the draft vehicle. Generally this type of steering arrangement is satisfactory while the trailer is being hauled, but certain shortcomings therein appear when the trailer is being backed, inasmuch as it becomes difficult to steer the front wheels of the trailer properly to maneuver the trailer in close quarters. It may be said generally that this problem arises also during forward movement of the trailer in close quarters.

The invention contemplates and has for its principal object the provision of an improved steering mechanism for a vehicle which enables the steerable wheels of the vehicle to be properly steered for maneuvering the vehicle under circumstances where the main steering means proves inadequate.

An important object is to provide an auxiliary steering means for steering the steerable wheels independently of the main steering means.

Another important object is to provide connecting means between the main steering means and the steering mechanism, said means being optionally engageable or disengageable between said two elements, whereby the steering mechanism is optionally operable by or independently of the steering means.

And another object is to provide the auxiliary steering element in the form of a member that may be manually manipulated.

Briefly and specifically these and other important objects are achieved in one preferred form of the invention wherein the improved steering arrangement is adapted for use in connection with a trailer having a pair of rear wheels and a pair of front steerable wheels provided with auto-type steering mechanism inculding a transverse tie-rod and a forwardly extending arm. The trailer includes a laterally swingable draft member adapted to be connected to a draft vehicle, and this member and the steering arm are normally interconnected so that lateral swinging of the draft member operates the steering arm to steer the front wheels. The connection between the draft member and steering arm is releasable so that the steering arm and draft member may have relative movement. An auxiliary steering element in the form of a manually operable steering rod is adapted to be connected to the steering arm for steering the front wheels independently of the function of the draft member.

A more complete understanding of these important objects and other desirable features of the invention may be had from the following detailed description taken in conjunction with the accompanying sheet of drawings, wherein:

Figure 1 is a schematic plan view of a trailer connected to a draft vehicle;

Figure 2 is a perspective view of the forward portion of the trailer, showing the steering arrangement;

Figures 3 and 4 are respectively transverse sectional views, showing different relations between the trailer draft member and the steering arm; and, Figures 5 and 6 are respectively similar views of a modified form of arrangement.

The particular type of vehicle chosen for the purposes of illustrating the present invention is represented in Figure 1 as a trailer vehicle comprising generally a frame 10 including a longitudinal reach 11 suitably disposed between front and rear axle structures 12 and 13. The trailer is supported by a pair of rear wheels 14 and a pair of steerable front wheels 15. As shown in Figure 1, the trailer includes a forwardly extending draft member 16 adapted to be connected at its forward end to the rear end of a draft vehicle generally represented by the numeral 17.

The draft member is pivotally carried at its rear end for lateral swinging movement about a vertical axis provided by a vertically disposed bolt or pin 18 carried between the upper and lower flanges of a bracket member 19 rigidly carried by the front axle structure 12.

As previously mentioned, the front wheels 15 of the trailer are steerable and are preferably associated with auto-type steering mechanism. Each wheel is appropriately carried on a spindle including a vertically disposed king pin portion appropriately journaled on a vertical axis in a journal 20 carried at an outer end of the axle structure 12. This type of structure is generally conventional, and for that reason has not been further illustrated. Each spindle and king pin element has a forwardly extending arm 21 rigidly secured thereto. These arms are cross-connected by a transverse tie-rod 22, the outer ends of the tie-rod being pivotally connected respectively to the forward ends of the arms 21.

The bracket member 19, which pivotally supports the draft member 16, also pivotally carries, preferably through the medium of the bolt or pin 18, a forwardly extending steering arm 23. This arm is pivotally connected by a pin 24 with a clamp member 25 rigidly carried intermediate the ends of the tie-rod 22. The arm or member 23 is provided with a pair of longitudinally spaced openings 26 and 27.

The draft element 16 carries near its rearward end a downwardly extending arm or member in the form of a bail 28, preferably formed of flat stock and having its upstanding legs secured to the member 16 by a transverse bolt 29. This bail member has a flat, transverse portion 30 formed with an opening 31. This opening is adapted to be alined with the opening 26 in the arm 23 and a headed pin or bolt 32 passed therethrough. This is best shown in Figures 3 and 4. By this means the member 16 and the arm 23 are interconnected for lateral swinging movement together, and accordingly the front wheels are steered through the medium of the draft member.

In order to provide for eliminating certain undesirable strains on the connecting bolt 32, the member 28 is provided with a pair of laterally spaced lugs 33 generally transversely alined with the opening 31 therein. As best shown in Figure 3, these lugs are spaced apart and are adapted to receive therebetween an intermediate portion of the steering arm 23.

A modified form of the connection between the draft member and the steering arm is shown in Figure 5, wherein the bail member 28 is provided at the underside of its transverse portion 30 with a downwardly extending engageable portion 35. This portion is preferably welded or otherwise rigidly secured to the portion 30 of the member 28. The arm 23 in this instance takes the form of an arm 23', preferably channel-shaped in cross section, so that the opposite legs of the channel become arranged at opposite sides respectively of the portion or member 35 when the draft member 16 and the arm 23' are connected. The bolt or pin 32 is then used to connect the parts.

From the foregoing description it will be seen that the draft member 16 constitutes generally a main steering means operable to steer the steerable front wheels 15 of the trailer. As previously mentioned, it oftentimes becomes difficult to maneuver the trailer in close quarters. For this purpose the invention provides an auxiliary steering arrangement to be presently described.

From an examination of Figure 2, it will be seen that the steering arm 23 extends slightly forwardly of the member 28 carried by the draft member 16, at which point it is provided with the aforesaid opening 27. An auxiliary steering means is provided in the form of a manually operable steering member or rod 36 having at one end thereof a handle portion 37 and at the other end thereof a reversed hook portion 38 adapted to be inserted through the opening 27 in the steering arm 23. The bolt or pin 32 provides a releasable connection between the arm 23 and the member 28 and may consequently be removed in order to permit relative movement between the member 16 and the arm 23. The steering rod 36 is then connected to the arm 23 and the wheels steered thereby while the vehicle is moved slowly. The particular arrangement herein set forth may perhaps necessitate the use of two operators, but it is found possible for one operator to operate the steering arrangement by setting the position of the wheels before moving the vehicle. In either event it will be seen that the fundamental purposes of the invention are accomplished.

As stated above, the member 28 is provided with the engaging lugs 33. In order to prevent accidental engagement between these lugs and the arm 23 when the parts are disconnected in the manner outlined, the bolt 32 is replaced in the opening in only the portion 30 of the member 28. The bolt or pin is provided with a head 32' which, when the bolt is replaced in inverted position in the member 28, substantially occupies the space between the lugs formerly occupied by the arm 23. This arrangement is best shown in Figure 4. The bolt is further provided with a nut 39 to retain the bolt in position. It will be appreciated that this nut is useful in retaining the bolt in position when the member 28 and the arm 23 are normally interconnected, for the reason that there are sufficient road shocks to dislodge an ordinary pin dropped through the opening. This detail is, however, merely a specific part of the structure illustrated and is not intended to limit the scope of the invention.

The relation between the parts of the modified form as shown in Figures 5 and 6 is substantially similar to that just described. The bolt 32 is removed from its connecting position between the parts 28 and 23' and reinserted in only the member 23', the head 32', as shown in Figure 6, substantially occupying the space between the legs of the channel formerly occupied by member or portion 35 carried by the member 28.

As previously mentioned the bail member 28 is carried by the draft member 16 through the medium of the transverse bolt 29. It may thus be seen that the member 28 may be pivoted on the draft member 16 and may be swung longitudinally of the member 16 and out of the path of movement of the arm 23. It is possible, however, that the member 28 may become accidentally displaced, and the bolt or pin arrangements shown in Figures 4 and 6 have been provided to anticipate this occurrence. It may at this point be stated that the arrangement shown is only a preferred construction and is not indicative of the numerous types of releasable connections that may be employed for the aforementioned purposes within the scope of the invention. It may be further stated that the invention is adapted for use under other circumstances than those outlined and may be as readily adapted to ordinary vehicles not of the trailer type. It will be further appreciated that numerous other alterations and modifications may be made in the particular embodiment illustrated without departing from the spirit and scope of the invention as defined in the appended claims.

What is claimed is:

1. A steering arrangement for a trailer vehicle including a frame carried on a pair of steerable wheels, a laterally movable steering member for the wheels having an opening therein, a pair of spaced lugs arranged on the member with the opening therebetween, a draft element pivoted on the frame for lateral movement and adapted to be connected to a draft vehicle, said element including a steering arm having a portion normally adapted to overlie the first steering arm and to fit between the lugs thereon, said second member having an opening therethrough normally alined with the opening in the first member, a headed connecting pin passed through the openings in the members to secure the same together for lateral movement together, said pin being removable to permit independent lateral movement of the members, said pin being replaceable in the opening in only the first member, the headed end of the pin substantially occupying the space between the legs on the first member formerly occupied by the aforesaid second member portion, whereby interengagement of the members is prevented during disconnection thereof.

2. A steering arrangement for a trailer vehicle including a frame carried on a pair of steerable wheels, a laterally movable steering arm extending longitudinally of the frame in straight-ahead position of the wheels, said arm having an opening therein, a draft element carried by the frame for lateral movement and extending generally in alinement with the arm, a steering member carried by the draft member above the arm and having an opening therein normally alined with the opening in the arm and including a pair of spaced lugs depending respectively at and normally engaging opposite sides of the arm and generally alined with the openings, and a removable headed pin passed downwardly through the openings to connect the arm and draft element together for lateral movement together, said pin being removable and replacable upwardly through the opening in only the member on the draft element, the headed end of the pin substantially occupying the space between the lugs on the member, whereby the arm may have free lateral movement relative to the draft element and member.

3. A steering arrangement for a trailer vehicle including a frame carried on a pair of steerable wheels, a laterally movable steering arm extending longitudinally of the frame in straight-ahead position of the wheels, said arm having an opening therein and provided with a pair of upstanding lugs generally alined transversely with the opening and arranged respectively at opposite sides of the arm, a laterally swingable draft element carried by the frame and having a steering member arranged above the arm adapted to fit between and engage the lugs on the arm, said member having an opening therethrough normally alined with the opening in the arm, and a headed pin passed downwardly through the openings in the member and the arm to connect same together for lateral movement together, said pin being removable and the arm and member laterally separable, the pin being replaceable downwardly through the opening in only the arm, the headed end of the pin substantially occupying the space between the lugs on the arm formerly occupied by the member, whereby the arm and member may have free relative lateral movement.

4. A steering arrangement for a trailer vehicle including a frame carried on a pair of steerable wheels, a laterally movable steering member for the wheels having an opening therethrough, a laterally movable draft element carried by the frame and including a member thereon having an opening therethrough, said members being arranged with one closely overlying the other and the openings therein normally alined, one of said members including a lug normally engaging the other member for movement of the members laterally together, a headed pin passed through the openings in the members to connect the members, said pin being removable from the members and replaceable in the member having the lug with the headed end of the pin extending with the lug, said headed end being substantially coextensive with the lug, whereby the members may have free relative lateral movement.

GORDON G. McNAMARA, Jr.